July 3, 1956 M. I. CURL 2,753,475
DECELERATION SENSING DEVICE
Filed Dec. 20, 1952

INVENTOR.
MARK I. CURL

BY
R. L. Miller
ATTORNEY

United States Patent Office 2,753,475
Patented July 3, 1956

2,753,475

DECELERATION SENSING DEVICE

Mark I. Curl, Cuyahoga Falls, Ohio, assignor, by mesne assignments, to The Goodyear Tire & Rubber Company, a corporation of Ohio Application December 20, 1952, Serial No. 327,123

2 Claims. (Cl. 310—114)

This invention relates to anti-skid control apparatus, and especially to electrical means for eliminating braking forces on a wheel when the rate of de-acceleration of the wheel exceeds a usable maximum.

In various structures, such as airplane wheels, it is very desirable that the rate of brake application, or de-acceleration of the rotating wheels, be controlled so that no excessive braking forces are applied since the application of such forces may cause the braked wheel to skid, or else it might set up excessive stresses with possible failure of the brake means, or the associated means, such as struts, used to position the wheel and brake assembly on a vehicle, such as an aircraft. While some types of control means have heretofore been proposed for controlling the rate of de-acceleration of braked wheels, none of such controls has been completely satisfactory insofar as I am aware.

The general object of the present invention is to provide brake action control means wherein such means are primarily of an electrical nature and are used to prevent more than a usable maximum rate of de-acceleration of the wheel with which the control is associated.

Another object of the invention is to provide a relatively uncomplicated, inexpensive, anti-skid or de-acceleration device for use in conjunction with a brake for terminating or reducing brake actuation when predetermined braking forces, such as wheel skidding conditions, have been established.

Another object of the invention is to provide an easily adjusted control apparatus which utilizes electrical current proportionate to the rate of de-acceleration of a wheel for controlling brake operation to limit the action thereof.

Yet another object of the invention is to use a pair of electrical generating means in a brake control wherein one generating means functions continually proportionately to the rotative speed of the braked wheel and wherein the other generating means is driven by the braked wheel but has overrunning clutch means connecting it to the braked wheel to permit it to be free from brake action to set up an electrical differential for use in controlling brake actuation.

The foregoing and other objects and advantages of the invention will be more apparent as the specification proceeds.

For a better understanding of the invention, reference should be had to the accompanying drawings wherein one currently preferred embodiment of the principles of the invention is shown, and wherein.

Figure 1:
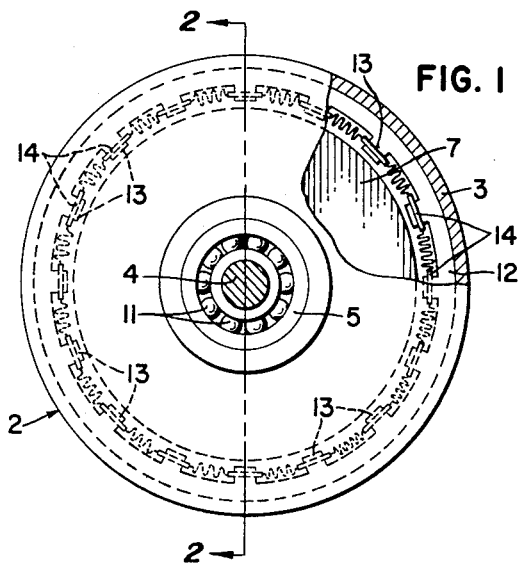
Fig. 1 is an elevation, partly broken away and shown in section, of the electrcial generator means of the invention.
Figure 3:
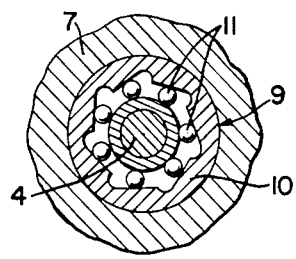
Fig. 3 is a detail section on line 3—3 of Fig. 2.

The present invention relates to apparatus for controlling the de-acceleration rate of a wheel and the apparatus includes a shaft for being driven at a speed proportionate to the controlled wheel, a flux producing rotor secured to the shaft, a flux producing flywheel journaled on the shaft, an overriding clutch connecting the flywheel to the shaft, an iron core surrounding the rotor and the flywheel, separate coil means on the iron core for the rotor and the flywheel, means connecting the coil means in opposition and with the coil means having separate electrical potentials produced therein by rotation of the rotor and the flywheel, and a relay connected to the output leads of the combined coil means for actuation when a predetermined amount of electrical energy differential exists in the two coil means.

The details of the apparatus shown in the drawings include a wheel de-acceleration control apparatus generally indicated by the numeral 1, and which includes a special generator indicated as a whole by the numeral 2. The generator 2 is shown as including a housing 3 in which a suitable shaft 4 is journaled by conventional bearings 5. This shaft 4 may be suitably connected to a driven wheel (not shown) for rotation thereby, as being keyed to the axle of such wheel, or the shaft 4 may be connected, as by gears, to the wheel to which brake forces are to be applied and the de-acceleration rate of which wheel is to be limited or controlled by the apparatus so that the shaft 4 would be driven at a speed proportionate to that of the wheel. In the generator 2 shown, two flux producing members are carried by the shaft 4 for two generator actions and these members are connected to and normally rotate with the shaft 4. In this instance, such flux producing members are shown as being a rotor 6 that is suitably fixedly secured to the shaft 4 for rotation therewith, and that usually comprises a permanent magnet. The second rotating flux producing member comprises a flywheel 7 that is shown journaled on the shaft 4 by a conventional bearing 8 whereas the flywheel 7 is connected to the shaft 4 for rotation therewith by means of an overriding clutch 9. Thus normally the flywheel 7 will rotate with and be driven by the shaft 4 as a unit but with the flywheel 7 being free to continue rotation at its given rate of speed when the shaft 4 has sudden braking or de-acceleration forces applied thereto. This clutch 9 is of conventional construction and includes an outer ring 10 secured to the flywheel 7 and with the ring 10 engaging an inner ring of the clutch 9 by means of drive balls 11. The flywheel 7 is normally made from a permanent magnet, like the rotor 6, and the inherent electromotive forces of the rotor 6 and flywheel 7 usually are at least substantially equal so that normally substantially equal electrical forces are induced in both portions of the generator 2.

Figure 2:
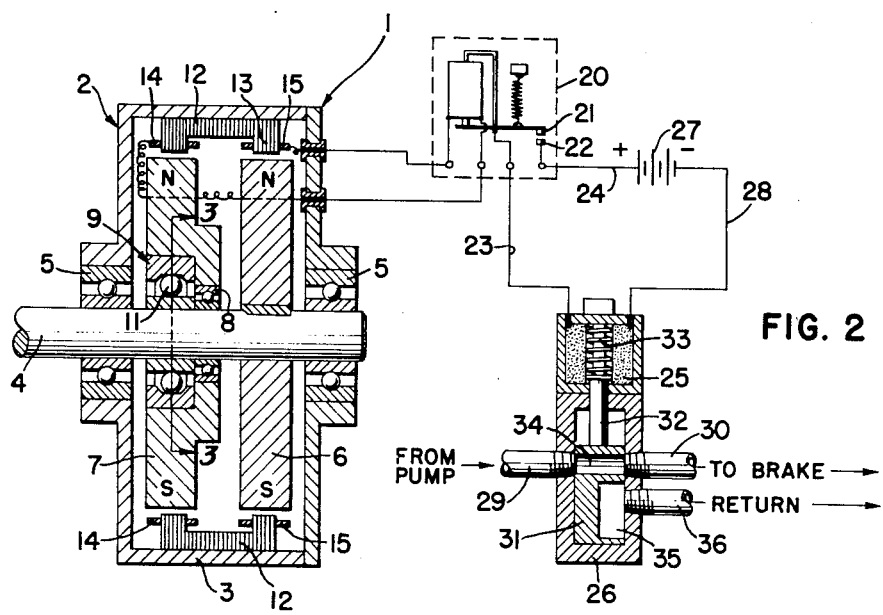
Fig. 2 is a section on line 2—2 of the generator means of Fig. 1 showing the electrical generator coupled to the remainder of the control means including a solenoid valve which is shown in section.
Figure 4:
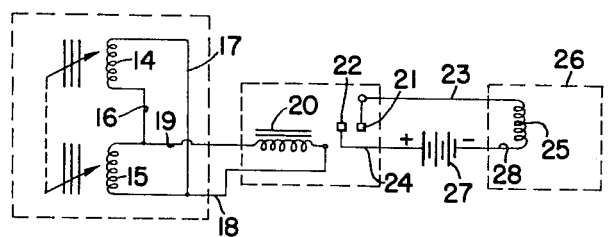
Fig. 4 is a schematic diagram of the electrical circuit of the invention.

The generator 2 includes a suitable metal core 12, usually iron, which is shown as being laminated and it has two sets of circumferentially spaced, radially inwardly directed lugs or projections 13 thereon on which a plurality of coils 14, 14 and 15, 15 are wound. Fig. 2 best shows that the sets of the lugs 13 on the iron core 12 are spaced axially from each other to place one set of lugs adjacent the rotor 6 and one set adjacent the flywheel 7. Thus two annular series of the coils 14 and 15 can be provided to form the field coils of separate generators provided in the generator 2. The field coils of the separate generators preferably have an equal number of turns and are carried by same size metal cores so that equal electrical forces will normally be induced in such coils 14 and 15 by action of the equal strength rotor and flywheel. Hence, normally the apparatus of the invention has no operating net electrical potential provided by the two generators of the system, as the outputs of the series of coils 14 and 15 are connected in opposition to each other. The coils 14 have leads 16 and 17 that connect such coils 14 to the series of coils 15 and two output leads 18 and 19 are provided for transmitting the resultant net electrical differential from the two sets of field coils. These output leads 18 and 19 are connected to a control relay 20 which is of a suitable adjustable type so that it can be set for actuation when a predetermined amount of current is caused to flow therethrough by the net voltage supplied by the leads 18 and 19. The relay 20 is shown as controlling contacts 21 and 22 for closing a circuit therethrough when the relay is actuated. These contacts 21 and 22 connect, respectively, to leads 23 and 24 that connect to a coil 25 of a solenoid valve 26, and a battery or other conventional source of electrical energy 27, respectively. A lead 28 connects the other terminal of the battery 27 to the remaining lead of the coil 25 of the solenoid valve 26.

In order to produce the desired braking control action, the solenoid valve 26 has an inlet conduit 29 that connects to a suitable source of hydraulic fluid for use in the braking system to be controlled by the apparatus of the invention. The pressure on the fluid in the inlet conduit 29 is controlled by any desired conventional brake application means (not shown). Likewise, the solenoid valve 26 has an outlet conduit 30 that connects to a conventional brake system (not shown) to transmit brake actuation energy thereto. The solenoid valve has a control piston or plunger 31 slidably positioned therein and such piston has a metal rod or solenoid core 32 extending therefrom for telescoping movement along the axis of the coil 25. Thus, when the solenoid valve is in its normal, unactuated position, a spring 33 engages the core 32 to position a bore 34 in the piston 31 to connect the hydraulic fluid pressure inlet or supply conduit 29 to the outlet conduit, or brake supply conduit 30 for transmittal of the pressure fluid to the brake for brake action. However, when the solenoid coil 25 is actuated, it moves the piston 31 to connect a recess 35 in the piston 31 to the outlet conduit 30 and connect such conduit 30 to a fluid return conduit 36 which connects to the solenoid valve 26. Such return conduit 36 functions to permit draining of the pressure fluid from the brake means and conventional return of such fluid to suitable fluid storage means in the braking system.

It will be realized that upon de-acceleration of the shaft 4, the flywheel 7 will continue its given rotational speed to produce greater electrical energy in its associated series of field coils 15 than will be produced by the then more slowly rotating rotor 6 so that a differential amount of electrical energy will be produced in the two generators provided within the generator 2. Such voltage differential, when it reaches a predetermined value, can be used to actuate the solenoid valve and shut off the braking action until the rotor 6 and flywheel 7 again rotate at at least substantially the same speeds.

The control apparatus of the invention is relatively uncomplicated but it will provide a light-weight, positive acting control by which the rate of de-acceleration of a rotating wheel can be controlled to prevent the application of excessive braking stresses to the controlled wheel. Thus, it is thought that the objects of the invention have been realized.

The electric signal from the sensing generator 2 is directly proportionate to the de-acceleration rate of the wheel with which it is associated.

It will be understood that hydraulic valve means may be used which would give a flow rate therethrough proportionate to the de-acceleration rate to vary the brake action in a desired ratio to the wheel de-acceleration, rather than to terminate brake action as done by the solenoid operated valve 26 illustrated herein.

While a certain representative embodiment and details have been shown for the purpose of illustrating the invention, it will be apparent to those skilled in this art that various changes and modifications may be made therein without departing from the spirit or scope of the invention.

Having thus described my invention, what I claim is:

1. A deceleration sensing device comprising a fixed casing of cup-shape, a disc closing the end of the casing, a bearing at the center of the disc, a bearing at the center of the cup-shaped casing in alignment with the first-named bearing, a shaft journalled in said bearings and adapted to be driven by the element whose deceleration is to be sensed, a permanent magnet rotor fixed to the shaft inside the casing, a permanent magnet fly-wheel journalled to the shaft inside the casing, an over-running clutch connecting the fly-wheel in accelerating movement of the shaft but allowing the fly-wheel to freely over-run the rotor in decelerating movement of the shaft, an annular metal core inside the casing and surrounding the rotor and fly-wheel and having separate pole pieces extending into proximity with both the rotor and fly-wheel, separate field coils around the pole pieces, the field coils adjacent the rotor being connected in electric opposition to the field coils adjacent the flywheel, and a pair of electric leads extending from the field coils to conduct an electric signal which is proportional to the deceleration.

2. A deceleration sensing device comprising a shaft, a permanent magnet rotor fixed to the shaft, a permanent magnet fly-wheel journalled to the shaft, an over-running clutch connecting the fly-wheel to the shaft in accelerating movement of the shaft but allowing the fly-wheel to freely over-run the rotor in decelerating movement of the shaft, an annular metal core and surrounding the rotor and fly-wheel and having separate pole pieces extending into proximity with both the rotor and fly-wheel, separate field coils around the pole pieces, the field coils adjacent the rotor being connected in electric opposition to the field coils adjacent the flywheel, and a pair of electric leads extending from the field coils to conduct an electric signal which is proportional to the deceleration.

References Cited in the file of this patent

UNITED STATES PATENTS

| | | |
|---|---|---|
| 2,012,738 | Baughman | Aug. 27, 1935 |
| 2,038,144 | Thomas | Apr. 21, 1936 |
| 2,038,146 | Cook et al. | Apr. 21, 1936 |
| 2,256,287 | McCune | Sept. 16, 1941 |
| 2,381,211 | Crittenden | Aug. 7, 1945 |
| 2,381,225 | Newell | Aug. 7, 1945 |
| 2,515,729 | Morrison | July 18, 1950 |